United States Patent
Gawlowski

(10) Patent No.: US 10,651,607 B1
(45) Date of Patent: May 12, 2020

(54) STACKED OPTICAL MODULE CAGE WITH IMPROVED AIRFLOW TO BOTTOM PORTS

(71) Applicant: Arista Networks, Inc., Santa Clara, CA (US)

(72) Inventor: Matthew Gawlowski, Santa Clara, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 16/418,819

(22) Filed: May 21, 2019

(51) Int. Cl.
*H01R 13/659* (2011.01)

(52) U.S. Cl.
CPC .................................. *H01R 13/659* (2013.01)

(58) Field of Classification Search
CPC .. H01R 13/659; G02B 6/0085; G02B 6/3814; G02B 6/4269
USPC ........ 439/487, 540.1, 541.5, 607.01, 697.06, 439/607.1, 607.2, 607.21, 607.23, 607.24
See application file for complete search history.

(56) References Cited

U.S. PATENT DOCUMENTS

| | | | | |
|---|---|---|---|---|
| 6,276,963 B1* | 8/2001 | Avery | .................. | H01R 13/518 439/541.5 |
| 7,070,446 B2* | 7/2006 | Henry | ................ | H01R 13/6594 439/541.5 |
| 7,845,975 B2* | 12/2010 | Cheng | .................. | H05K 9/0058 439/541.5 |
| 8,197,282 B1* | 6/2012 | Su | ....................... | H01R 13/6587 439/540.1 |
| 8,545,268 B2* | 10/2013 | Fogg | .................. | H01R 13/6587 439/607.25 |
| 9,042,096 B2* | 5/2015 | Thomas | ..................... | H04L 1/00 361/688 |
| 9,246,280 B2* | 1/2016 | Neer | ..................... | G02B 6/4246 |
| 9,252,538 B2* | 2/2016 | Recce | .................. | H01R 13/641 |
| 9,341,794 B1* | 5/2016 | Curtis | .................. | G02B 6/4269 |
| 10,249,983 B2* | 4/2019 | Regnier | ............. | H05K 7/20509 |
| 2002/0025720 A1* | 2/2002 | Bright | .................. | G02B 6/4246 439/541.5 |
| 2002/0197043 A1* | 12/2002 | Hwang | ................ | H01R 13/659 385/134 |
| 2006/0003632 A1* | 1/2006 | Long | ..................... | H05K 9/0058 439/607.2 |
| 2013/0164970 A1* | 6/2013 | Regnier | ............. | H05K 7/20509 439/487 |

(Continued)

*Primary Examiner* — Harshad C Patel
(74) *Attorney, Agent, or Firm* — Fountainhead Law Group P.C.

(57) ABSTRACT

A housing with improved airflow is provided. The housing includes a cage dimensioned to hold two modules side-by-side in a lower compartment and a further two modules side-by-side in an upper compartment. The cage has a middle compartment between the lower compartment and the upper compartment, with a heatsink in the middle compartment in thermal contact with the two modules when the two modules are in the lower compartment. The middle compartment is ventilated through a first one or more apertures in each of two or more exterior walls of the cage, the middle compartment is further ventilated, when the upper compartment is unoccupied, through a second one or more apertures in an interior wall of the cage separating the middle compartment and the upper compartment, wherein the further two modules when occupying the upper compartment obstruct the second one or more apertures.

20 Claims, 7 Drawing Sheets

(56) References Cited

U.S. PATENT DOCUMENTS

2014/0154912 A1\* 6/2014 Hirschy ............. H01R 13/6595
439/487
2016/0174415 A1\* 6/2016 Ito ........................... G02B 6/42
361/715

\* cited by examiner

US 10,651,607 B1

STACKED OPTICAL MODULE CAGE WITH IMPROVED AIRFLOW TO BOTTOM PORTS

BACKGROUND

Module cages, for various modules, are many and varied. To improve port density in network communication equipment, optical modules are often stacked two or more rows high. This limits the height of the heatsink for the bottom row of modules, and with that physical limitation comes a similar limitation in how much heat can be dissipated by the heatsink. A need exists to increase the power level of the module. One problem that occurs is how to improve heatsink performance in the same volume of space as existing designs for module cages.

SUMMARY

In some embodiments, a housing with improved airflow is provided. The housing includes a cage dimensioned to hold two modules side-by-side in a lower compartment and a further two modules side-by-side in an upper compartment. The cage has a middle compartment between the lower compartment and the upper compartment, with a heatsink in the middle compartment in thermal contact with the two modules when the two modules are in the lower compartment. The middle compartment is ventilated through a first one or more apertures in each of two or more exterior walls of the cage, the middle compartment is further ventilated, when the upper compartment is unoccupied, through a second one or more apertures in an interior wall of the cage separating the middle compartment and the upper compartment, wherein the further two modules when occupying the upper compartment obstruct the second one or more apertures.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
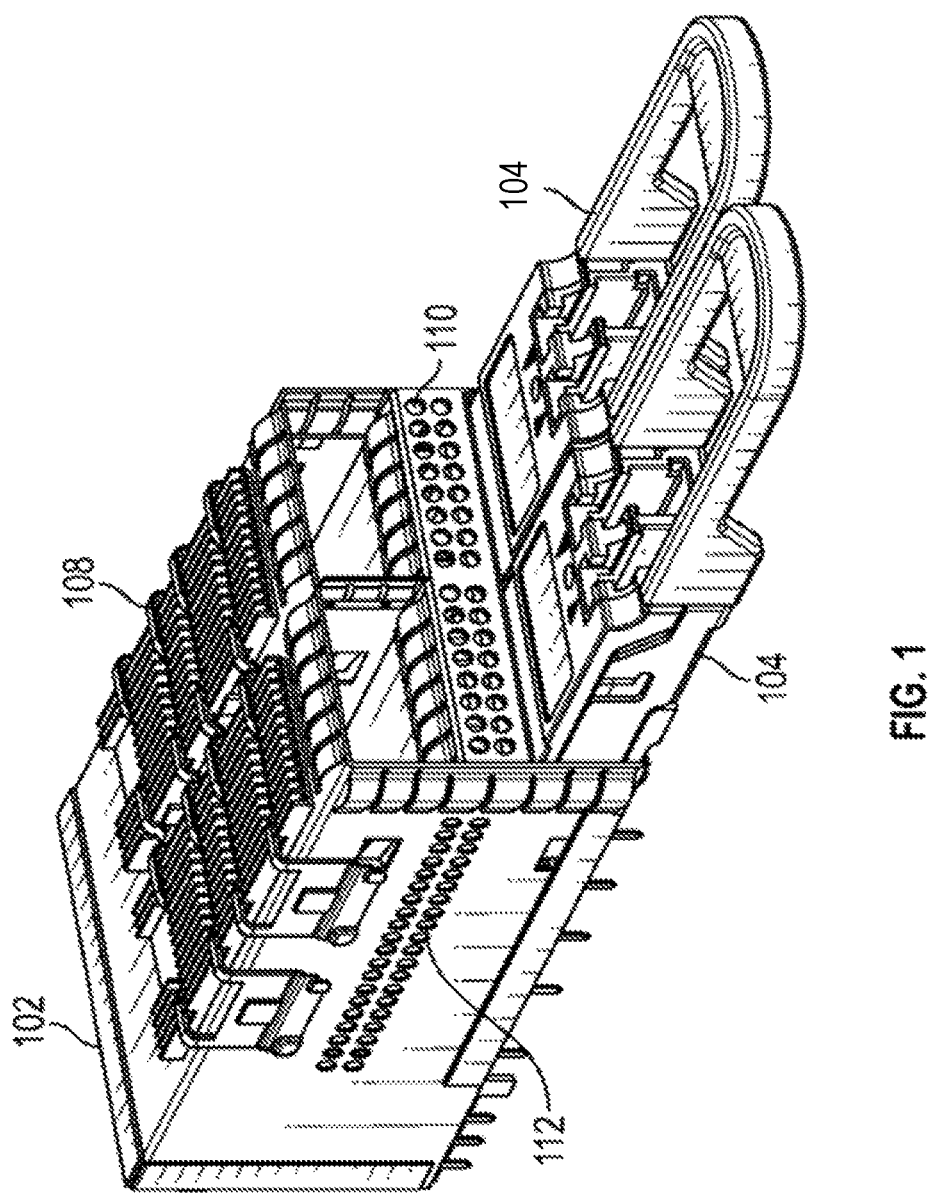
FIG. 1 illustrates a 2×2 stacked cage with two quad small form pluggable (QSFP) modules in the bottom compartment of the cage.

An improved module cage, with improved airflow to a heatsink in the module cage when the module cage is partially populated, i.e., not fully populated with modules, is described herein in various embodiments, with variations readily developed. Added vents, which are not present in a preceding design of a cage for quad small form pluggable (QSFP) modules, support additional ventilation to a middle compartment with a heatsink for cooling QSFP modules in a bottom compartment, when the upper compartment of the cage is unoccupied. When QSFP modules are in the upper compartment, the added vents and additional cooling are obstructed, and all four of the QSFP modules in the cage receive ventilation and associated cooling comparable to that of a standard QSFP module cage. Various embodiments shown herein are modifiable for various types of modules. Various embodiments shown herein are modifiable for a module cage supporting a single stack, one module below and one above as a 2×1 arrangement, and other stacks of modules such as 2×3, 2×4, etc., with an upper compartment and upper row of one or more modules, a lower compartment and row of one or more modules, and a middle compartment with a heatsink. It should be appreciated that the embodiments, while described with reference to QSFP cages, are not limited to QSFP cages as other cages requiring efficient heat removal may integrate the embodiments described herein.

Various embodiments described herein address, but are not limited to, a specific case where high powered optical modules, or in some embodiments electrical modules, would be installed in the bottom row of some stacked cages, but no modules would be installed in the top row. Those empty spaces in the top row may be utilized to increase airflow over the heatsink for the bottom row modules. This is accomplished by adding vent holes to the bottom surface of the top row ports. These vent holes are covered when an optical module is installed in the top ports. Some embodiments target a system where, in the field, the system may be configured as either maximum port count (with all ports of the cage occupied by modules and thermal performance similar to current systems), or decreased port count at maximum power levels (with the lower ports occupied by modules and improved thermal performance for cooling those modules, and the upper ports unoccupied).

Normally a port in a stacked cage is designed to work independently of the other ports, meaning, the user may install any optical module in any port with predictable results. Present embodiments break with that philosophy, requiring users to populate the ports in a specific pattern to optimize thermal performance. By doing so, embodiments are able to increase the airflow over the bottom module heatsinks by increasing the surface area devoted to vents.

Various embodiments of a module cage increase the area of the inlet vents at the front, by adding new vent holes to the previous-design surface above the heatsinks that are in contact with the lower QSFP modules. These vents are functional in the case where no modules have been installed into the top ports. It should be appreciated that this document refers to intake, exhaust, enters, exits, exit, etc., regarding airflow and air, suggesting a specific direction of airflow. It is entirely possible to reverse the airflow in a system, in various embodiments, such that vents described herein as the intake then become the exhaust and/or vice versa. This reverse airflow is an alternative embodiment that may be integrated with the embodiments discussed below.

FIG. 1 illustrates a 2×2 stacked cage 102 with two QSFP modules 104 in the bottom compartment of cage 102. The upper compartment of cage 102 is unoccupied by modules in this illustration. Air enters the middle compartment of cage 102 through apertures 110 (i.e., holes, openings) in a face of cage 102, and flows over one or more heatsinks in the middle compartment. The heatsinks are in contact with two QSFP modules 104 in the bottom compartment (see FIG. 2). Air exits through apertures 112 in further faces of cage 102, for example sides and rear of cage 102. Airflow may be driven by fans (not shown, but readily envisioned), and the airflow may flow in other directions in various embodiments. One or more further heatsinks 108 on the top of cage 102 contact QSFP modules 104, when inserted in the upper compartment of cage 102 (see for example FIG. 4).

Figure 2:
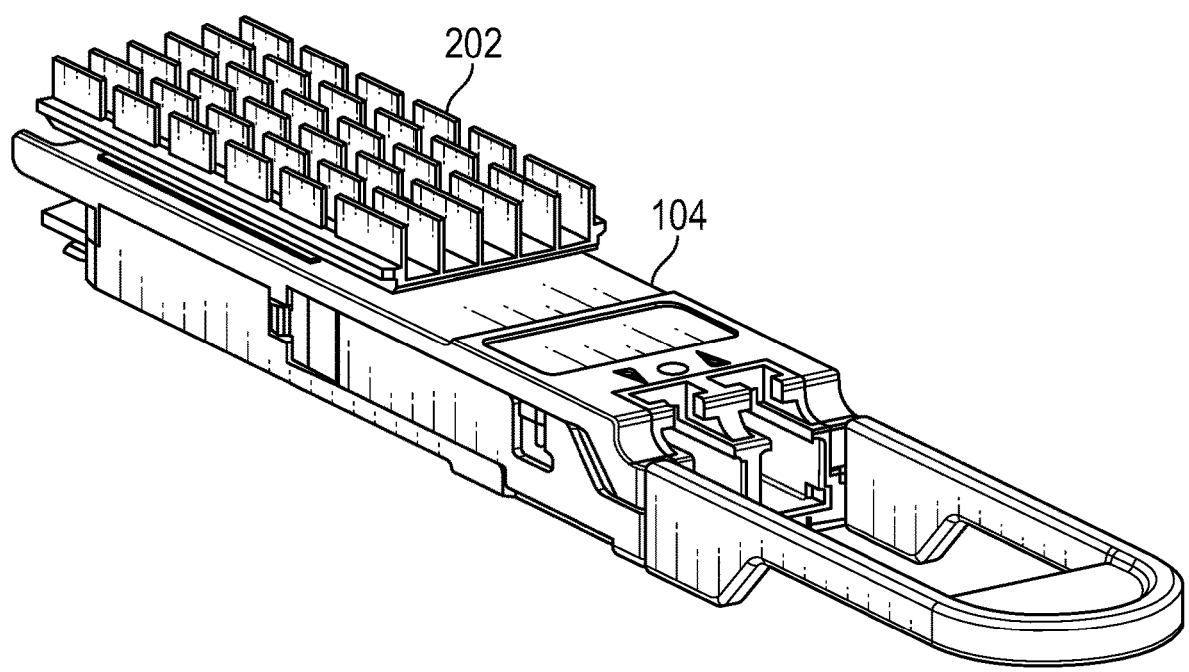
FIG. 2 depicts a QSFP module contacting the heatsink that is inside a middle compartment of the cage (with the cage hidden for clarity).

FIG. 2 depicts QSFP module 104 contacting heatsink 202 that is inside a middle compartment of cage 102 (with the cage hidden for clarity). Thus, QSFP module 104 in the bottom or lower compartment of cage 102 is cooled by airflow that passes through the middle compartment and over or through heatsink 202, for example between fins or through notches of heatsink 202. Further embodiments are not limited to this specific design of heatsink, and further heatsinks and arrangements of heatsinks are readily devised. A heatsink may be specific to a module, or a portion of a module, or shared by multiple modules in various embodiments.

Figure 3:
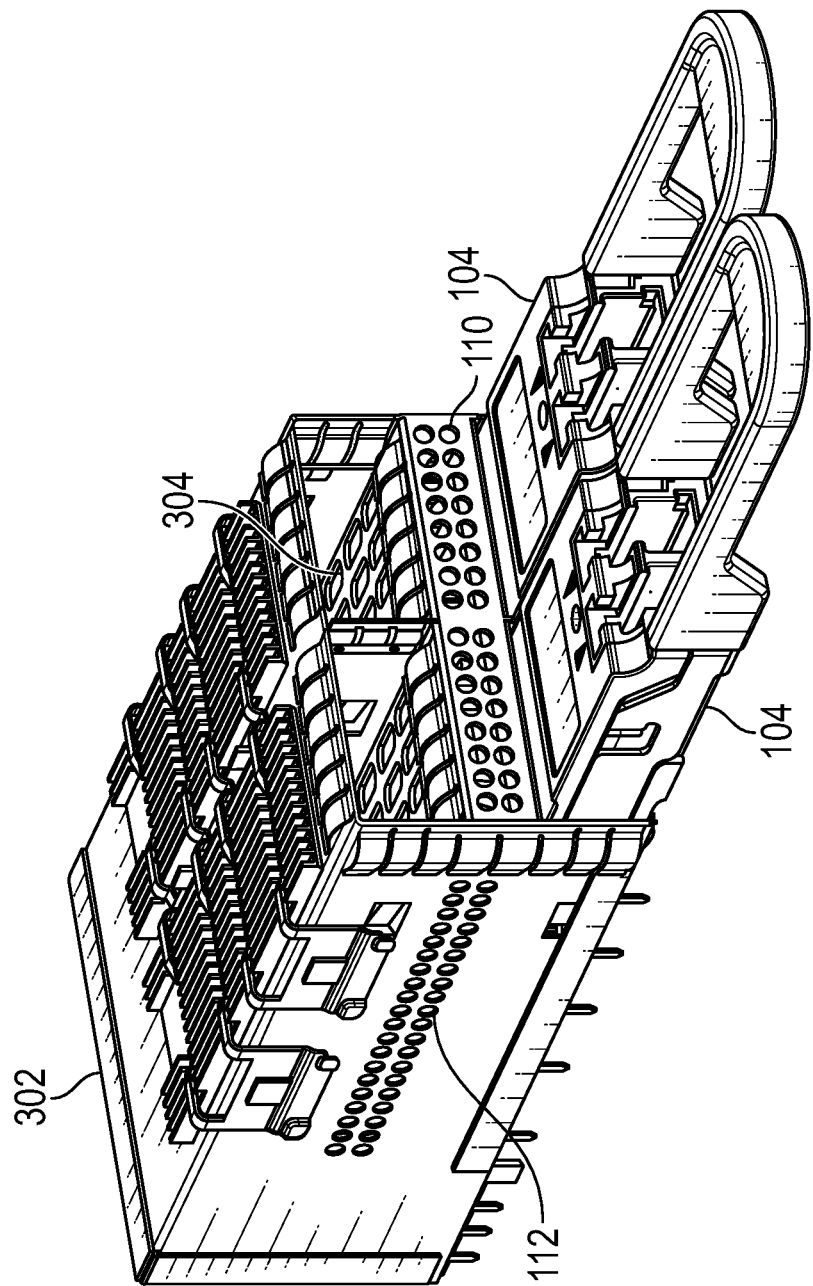
FIG. 3 illustrates a 2×2 stacked cage with added vents in accordance with an embodiment, providing increased airflow to the heatsink in the middle compartment of the cage, for cooling the QSFP modules in the bottom compartment of the cage.

FIG. 3 illustrates a 2×2 stacked cage 302 with added vents 304 in accordance with an embodiment, providing increased airflow to heatsink 202 (see FIG. 2) in the middle compartment of cage 302, for cooling QSFP modules 104 in the bottom compartment of the cage 302. Apertures 110, 112 in the faces of cage 302 continue to provide airflow to the heatsink 202 in the middle compartment of cage 302. The added airflow is available when the upper compartment is unoccupied by modules, i.e., empty. With the added airflow from added vents 304 in cage 302, and associated increased cooling, higher power QSFP modules 104 can be used in the bottom compartment than was the case with preceding cage 102.

Added vents 304 could take various forms in various embodiments. As shown in FIG. 3, vents 304 could be multiple apertures in a wall shared by or separating the upper compartment and the middle compartment. Further, vents 304 could be a single, large aperture, or an open space in the region between the middle compartment and the first compartment of the cage 302. It should be appreciated that the apertures may have differing shapes and are not limited to the shapes illustrated. In various embodiments, the middle compartment has ventilation through a region connecting the middle compartment and the upper compartment that is enabled when the upper compartment is empty. This region and the further ventilation are obstructed when the upper compartment is occupied.

Figure 4:
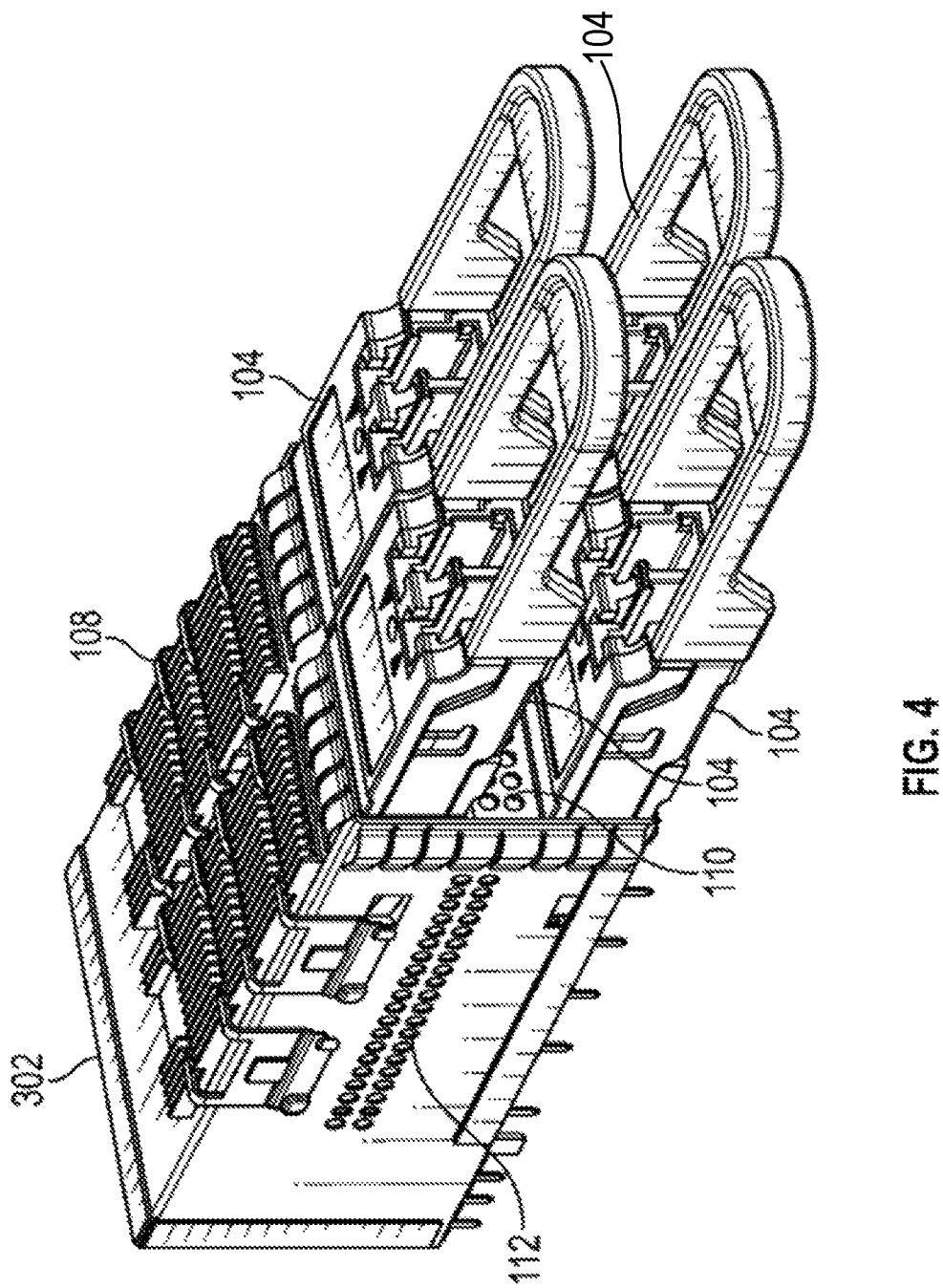
FIG. 4 depicts the 2×2 stacked cage of FIG. 3, with four QSFP modules, two in the upper compartment and two in the lower compartment of the cage.

FIG. 4 depicts 2×2 stacked cage 302 of FIG. 3, with four QSFP modules 104, two in the upper compartment and two in the lower compartment of cage 302. Two modules 104 side-by-side in the upper compartment block or obstruct added vents 304, preventing the added ventilation into, through or out of the middle compartment. Fully populated cage 302 has nominally the same thermal performance as the embodiment shown in FIG. 1. Ventilation through apertures 110, 112 into and out of the middle compartment of the cage 302 cooling heatsink 202 removes heat from two QSFP modules 104 side-by-side in the lower compartment of cage 302, and heatsinks 108 on the top of cage 102 remove heat from QSFP modules 104 in the upper compartment of the cage 302. In some embodiments, apertures 110, 112 may be placed towards or in the rear of cage 302.

Figure 5:
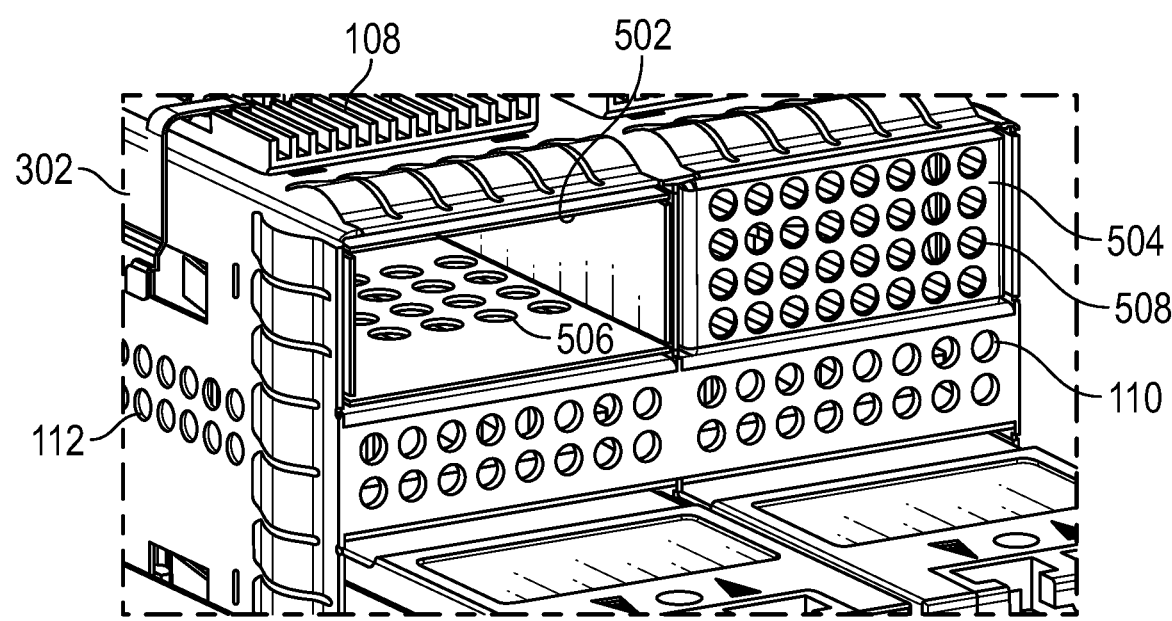
FIG. 5 illustrates two different plugs, each inserted into the upper compartment of the cage with added vents of FIG. 3, in accordance with embodiments of the present description.

FIG. 5 illustrates two different plugs 502, 504, each inserted into the upper compartment of cage 302 with added vents 304 of FIG. 3, in accordance with embodiments of the present description. Plug 502 on the left in FIG. 5 has an open face at a face of module cage 302, and has apertures 506 in a lower wall that is aligned with the wall (or, in some embodiments an open region) shared by or connecting the middle compartment and the upper compartment of cage 302. Added ventilation thus goes through the open face of plug 502, through apertures 506 of the wall of plug 502, and through added vents 304 of cage 302, or vice versa, in various directions in various embodiments. Two of the same plug 502 could be used in the upper compartment of cage 302 (not shown, but readily envisioned).

Plug 504 on the right in FIG. 5 has apertures 508 in a face of module cage 302. Added ventilation proceeds through apertures 508 in the face of plug 504 and through added vents 304 of cage 302, or vice versa, in various directions in various embodiments. Two of plugs 504 could be used in the upper compartment of cage 302 (not shown for illustrative purposes, but readily envisioned). In some embodiments apertures 110, 112, 506, and/or 508 are dimensioned to reduce or attenuate electromagnetic interference (EMI), i.e., the aperture size is small enough to achieve EMI shielding effectiveness for the wavelength associated with the electromagnetic wave utilized within the cage.

Figure 6:
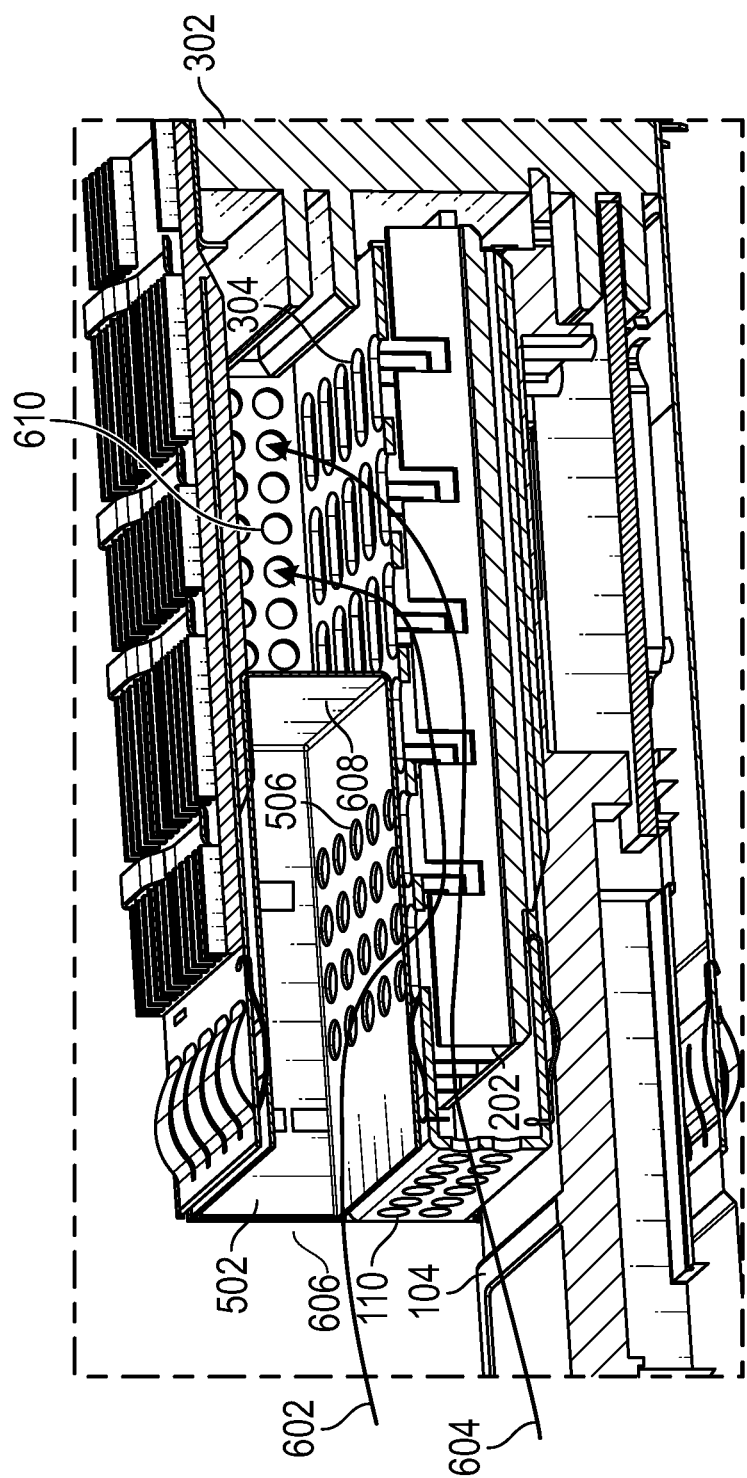
FIG. 6 depicts a perspective, cutaway view of a portion of the cage with added vents of FIG. 3, with one of the plugs of FIG. 5 inserted into the upper compartment of the cage.

FIG. 6 depicts a perspective, cutaway view of a portion of cage 302 with added vents 304 of FIG. 3, with one of plugs 502 of FIG. 5 inserted into the upper compartment of cage 302. The illustration features two airflows 602, 604 made possible by added vents 304 and plug 502. These airflows 602, 604 are depicted in a specific direction, which could be reversed in a further embodiment and could be based on passive or active conduction of air. One airflow 602 proceeds through an open face 606 of plug 502, through apertures 506 of a wall of plug 502 aligned with a wall separating or shared by the upper compartment and the middle compartment of cage 302, across or through the fins of heatsink 202 in the middle compartment, from the middle compartment to the upper compartment through the added vents 304, and out of the upper compartment through apertures 610 on a face of cage 302. A closed face 608, at the opposite end of plug 502 from open face 606, directs airflow 602 through apertures 506 rather than allowing airflow 602 to continue through the upper compartment without reaching heatsink 202. Another airflow 604 proceeds through apertures 110 in a face of cage 302, across or through fins of heatsink 202 in the middle compartment, from the middle compartment to the upper compartment through added vents 304, and out of the upper compartment through apertures 112 on the face of cage 302. In various further embodiments, further arrangements of apertures in plugs or walls, or open regions or open faces, are readily devised in keeping with the teachings herein.

Figure 7:
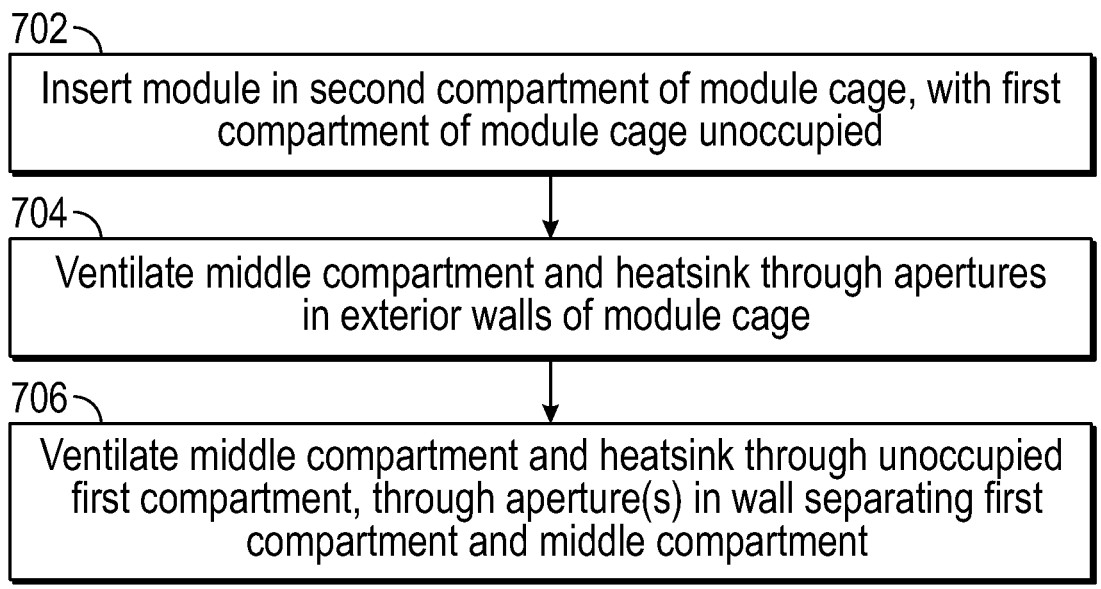
FIG. 7 is a flow diagram of a method of ventilating a module cage, which can be practiced by embodiments described herein, and variations thereof.

FIG. 7 is a flow diagram of a method of ventilating a module cage, which can be practiced by embodiments described herein, and variations thereof. In an action 702, a module is inserted in a second compartment of a module cage, with the first compartment of the module cage unoccupied. See, for example, an embodiment of a cage for QSFP modules, depicted in FIG. 3. In an action 704, the middle compartment and a heatsink are ventilated through apertures in exterior walls of the module cage. Example apertures for such ventilation are depicted in embodiments of a cage in FIGS. 3-6. An example heatsink is depicted in FIGS. 2 and 6. In some embodiments the ventilation emanates from forced air provided by fans associated with the device having the cage.

In an action 706, the middle compartment and the heatsink are ventilated through the unoccupied first compartment of the cage, through one or more apertures in a wall separating the first compartment and the middle compartment. Example apertures for such ventilation are depicted in embodiments of a cage in FIGS. 3, 5 and 6. It should be appreciated that the utilization of a plug in the unoccupied upper port locations ensures proper airflow over the bottom heatsink, in addition to aiding or enabling EMI shielding.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein. It should be appreciated that descriptions of direction and orientation are for convenience of interpretation, and the apparatus is not limited as to orientation with respect to gravity. In other words, the apparatus could be mounted upside down, right side up, diagonally, vertically, horizontally, etc., and the descriptions of direction and orientation are relative to portions of the apparatus itself, and not absolute.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A module cage, comprising:
   a first compartment for accepting a first module;
   a middle compartment having a heatsink and enabling ventilation through two or more sides of the cage;
   a second compartment for accepting a second module, the second module, when accepted, in thermal contact with the heatsink; and
   the middle compartment having further ventilation through a region connecting the middle compartment and the first compartment that is enabled when the first compartment is empty, the region and the further ventilation obstructed when the first module is in the first compartment.

2. The module cage of claim 1, wherein:
   the region connecting the middle compartment and the first compartment comprises a wall shared by the middle compartment and the first compartment; and the further ventilation through the region connecting the middle compartment in the first compartment comprises one or more apertures in the wall.

3. The module cage of claim 1, wherein:
the region connecting the middle compartment and the first compartment is an open space between the middle compartment and the first compartment.

4. The module cage of claim 1, wherein:
the ventilation through the two or more sides of the cage comprises a first plurality of apertures through each of the two or more sides of the cage, the two or more sides of the cage including a rear side of the cage; and
the further ventilation through the region connecting the middle compartment and the first compartment comprises a second plurality of apertures through a wall.

5. The module cage of claim 1, wherein:
the first compartment is dimensioned for a first row of modules including the first module; and
the second compartment is dimensioned for a second row of modules including the second module, wherein the first and second module comprise quad small form factor pluggable (QSFP) modules.

6. The module cage of claim 1 further comprising:
one or more plugs insertable into the first compartment each having an open face and a further wall alignable with the region connecting the middle compartment and the first compartment, the further wall having one or more apertures to support the further ventilation.

7. The module cage of claim 1 further comprising:
one or more plugs insertable to the first compartment and each having a face with one or more apertures to support the further ventilation.

8. The module cage of claim 1, wherein each of the ventilation through the two or more sides of the cage and the further ventilation through the region connecting the first compartment and the second compartment comprises a plurality of apertures dimensioned for reduced electromagnetic interference (EMI) in comparison to an open face.

9. The module cage of claim 1, wherein:
the ventilation through the two or more sides of the cage is to support cooling of the heatsink and the second module, when the second module has a first power level and is in the second compartment and the first module is in the first compartment; and
the ventilation through the two or more sides of the cage and the further ventilation through the region connecting the middle compartment and the first compartment are to support cooling of the heatsink and the second module, when the second module has a second, greater power level and is in the second compartment, and the first compartment is empty.

10. A housing with improved airflow, comprising:
a cage dimensioned to hold a plurality of modules side-by-side in a lower compartment and a further plurality of modules side-by-side in an upper compartment;
the cage having a middle compartment between the lower compartment and the upper compartment, with a heatsink in the middle compartment in thermal contact with the plurality of modules when the plurality of modules are in the lower compartment;
the middle compartment ventilated through a first one or more apertures in each of two or more exterior walls of the cage; and
the middle compartment to be further ventilated, when the upper compartment is unoccupied, through a second one or more apertures in an interior wall of the cage separating the middle compartment and the upper compartment, wherein the further two modules when occupying the upper compartment obstruct the second one or more apertures.

11. The housing with improved airflow of claim 10, further comprising:
a plug dimensioned for insertion to the upper compartment with the plug being open at a face of the housing and having a third one or more apertures parallel and adjacent to the second one or more apertures.

12. The housing with improved airflow of claim 10, further comprising:
a plug dimensioned for insertion to the upper compartment with the plug having a fourth one or more apertures in a face of the plug at a face of the housing.

13. The housing with improved airflow of claim 10, wherein each of the first and second one or more apertures is dimensioned to reduce electromagnetic interference (EMI).

14. The housing with improved airflow of claim 10, wherein the housing is dimensioned for a two by two arrangement of quad small form factor pluggable (QSFP) modules.

15. The housing with improved airflow of claim 10, wherein:
the housing has a first airflow, via the first one or more apertures, with sufficient cooling for the plurality of modules in the lower compartment having a first power level, and with the further plurality of modules occupying the upper compartment; and
the housing has a second airflow, via the first and second one or more apertures, with sufficient cooling for the plurality of modules in the lower compartment having a second, greater power level, and the upper compartment unoccupied.

16. A method of ventilating a module cage, comprising:
inserting a module in a second compartment of a module cage, so that the module makes thermal contact with a heatsink in a middle compartment of the module cage, and a first compartment of the module cage that is dimensioned for at least one module is unoccupied;
ventilating the middle compartment and the heatsink therein through a first one or more apertures in two or more exterior walls of the module cage; and
further ventilating the middle compartment and the heatsink therein through the first compartment and through a second one or more apertures in a wall separating the first compartment and the middle compartment.

17. The method of claim 16, further comprising:
inserting a further module in the first compartment of the module cage, so as to block the second one or more apertures and obstruct the further ventilating.

18. The method of claim 16, further comprising:
inserting a plug to the first compartment of the module cage, to direct the further ventilating through an open face of the plug and through a third one or more apertures in a wall of the plug aligned with the wall separating the first compartment and the middle compartment.

19. The method of claim 16, further comprising:
inserting a plug to the first compartment of the module cage, to direct the further ventilating through a third one or more apertures in a face of the plug and through the second one or more apertures in the wall separating the first compartment and the middle compartment.

20. The method of claim 16, further comprising:
removing a further module from the first compartment of the module cage, so that the first compartment is unoccupied, wherein the further ventilating the middle compartment and the heatsink comprises increasing ventilation of the middle compartment and the heatsink as compared to when the further module occupied the first compartment of the module cage.

* * * * *